April 19, 1938. W. H. BELLAH Re. 20,698
GAME APPARATUS
Original Filed Oct. 8, 1934 4 Sheets-Sheet 1
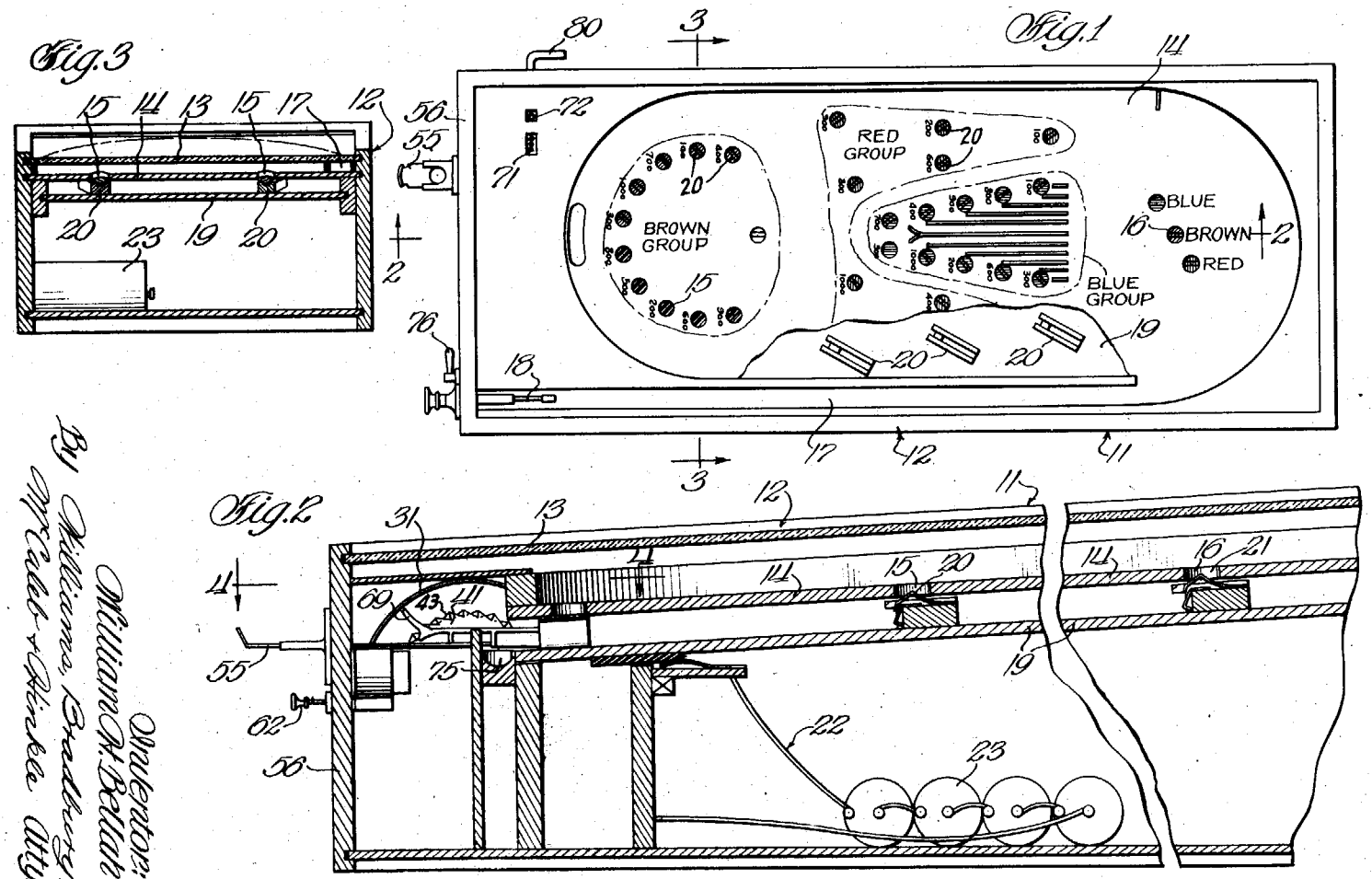
Inventor:
William H. Bellah
By Williams, Bradbury, McCaleb & Hinkle Attys.

April 19, 1938. W. H. BELLAH Re. 20,698

GAME APPARATUS

Original Filed Oct. 8, 1934 4 Sheets-Sheet 2

Inventor:
William H. Bellah
By Williams, Bradbury
McCaleb & Hinkle Attys.

April 19, 1938. W. H. BELLAH Re. 20,698

GAME APPARATUS

Original Filed Oct. 8, 1934 4 Sheets-Sheet 3

Inventor:
William H. Bellah
By Williams, Bradbury
McCaleb & Hinkle
Attys.

April 19, 1938. W. H. BELLAH Re. 20,698

GAME APPARATUS

Original Filed Oct. 8, 1934 4 Sheets-Sheet 4

Inventor:
William H. Bellah
By Williams, Bradbury, McCaleb & Hinkle
Attys.

Reissued Apr. 19, 1938 Re. 20,698

UNITED STATES PATENT OFFICE 20,698

GAME APPARATUS

William H. Bellah, Los Angeles, Calif., assignor, by mesne assignments, to James E. Johnson, Chicago, Ill.

Original No. 1,985,736, dated December 25, 1934, Serial No. 747,322, October 8, 1934. Application for reissue May 22, 1936, Serial No. 81,341

15 Claims. (Cl. 273—121)

This invention relates to a game apparatus.

It is an object of the present invention to provide an improved game apparatus which is relatively simple and inexpensive in construction and efficient in use.

A further object of the invention is to provide a game apparatus in which the player is rewarded by a free game or games for each time he attains an objective of the game apparatus.

Another object of the present invention is to provide a game apparatus, including a cabinet having an inclined playing board therein, said playing board being provided with ball-exit openings; and in which apparatus, if the player succeeds in playing balls into certain of said exit openings he may continue to play or operate the apparatus without inserting a coin into the coin aperture of the coin slide which is associated with the apparatus.

A further object of the invention is to provide a game apparatus in which the player is allowed or given a preselected number of free games if he succeeds in playing the balls into certain preselected exit openings or combinations of said exit openings in the playing board.

An additional object of the invention is to provide a game apparatus in which the spent balls may be released from the playing surface for return to the elevating and propelling devices, without the insertion of a coin into the coin aperture of the coin slide which is associated with the apparatus, in the event the player succeeds in playing a ball into a preselected opening in the playing surface upon which the balls are played; and to permit the player to continue to operate the apparatus, that is, to play upon the same, without inserting a coin or coins into the coin aperture of the coin slide so long as he continues to play the balls into certain predetermined ball exit scoring openings or combinations of openings, in the said playing surface.

Still another object of the invention is to construct the game apparatus in such a manner that the number of free games which the player has to his credit, at any time, may be readily determined by viewing a dial which is visible through a sight opening in the playing surface.

A further object of the invention is to construct the new game apparatus in such a manner that the objective score, that is, the numerical scoring value of the particular scoring opening at which the player elects to shoot, may readily be determined by viewing a second dial which is also visible through a sight opening in the playing surface.

A further object of the invention is to provide a new game apparatus having a plurality of objectives and means determining one of these objectives for the player to attain.

A further object of the invention is to provide a new game apparatus having a plurality of objectives, means determining one of these objects for the player to attain, and means for changing the objective for each game.

Othe objects, advantages and capabilities of the invention will appear from the following description of a preferred embodiment thereof, taken in conjunction with the accompanying drawings, in which:

Fig. 1 is a top plan view of a game apparatus embodying a preferred form of the present invention;

Fig. 2 is a vertical longitudinal sectional view on line 2—2 of Fig. 1;

Fig. 3 is a transverse vertical sectional view on line 3—3 of Fig. 1;

Figure 4:
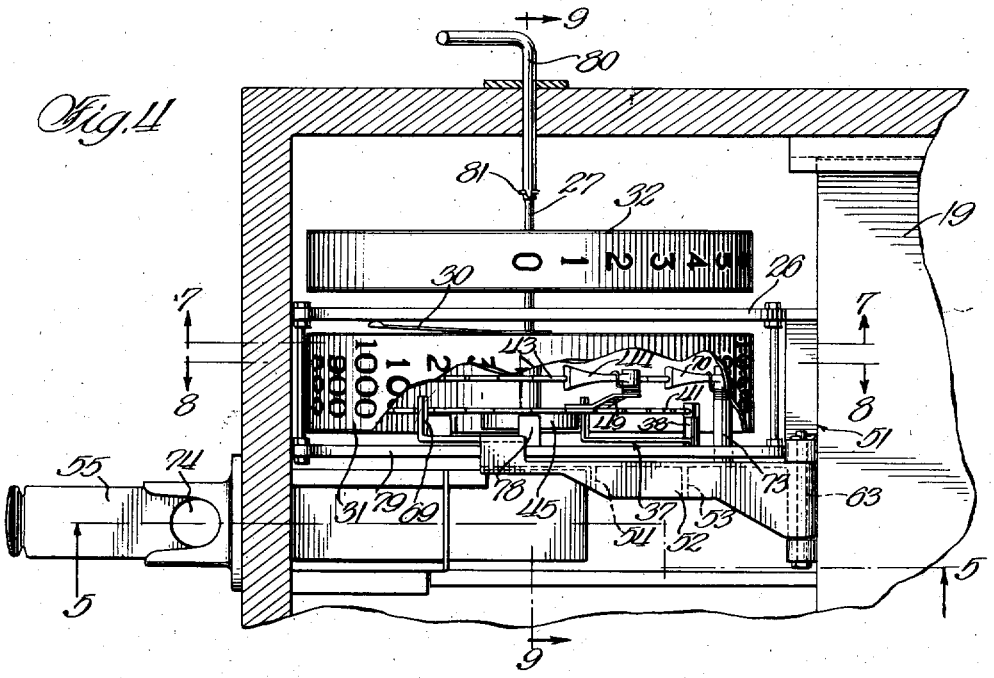
Fig. 4 is a view on line 4—4 in Fig. 2, partly in section and partly in top plan.

A preferred form of the new game apparatus is generally indicated at 11 in the drawings and comprises a cabinet 12 having a glass top 13 beneath which is arranged an inclined playing board 14; the inclined playing board 14 being provided with one or more banks or groups of ball exit scoring openings 15 and the said playing board 14 also being provided with one or more so-called "master" ball exit openings 16; each group or bank of exit openings 15 preferably bearing a distinctive color and bearing numerical scoring values, and each of the master exit openings 16 preferably bearing a distinctive color corresponding to the color of one of the groups of ball exit openings 15 (Fig. 1). It is to be understood, however, that the arrangement of scoring openings 15 and master scoring holes 16, as well as the numerical scoring values and color notations indicated adjacent these openings are merely for the purpose of illustrating and explaining the operation of the new game apparatus, as will be set forth more fully hereinafter, and the arrangement of scoring openings 15 and 16 and the numerical and color notations associated therewith (Fig. 1) are not in any way limitative of the invention nor the essence of the same.

Provided at one side of the playing board 14 is a ramp 17 along which balls are propelled one at a time, by a propelling device 18, onto the upper area of the inclined playing board 14, so that they may gravitate thereover and enter into one of the scoring openings 15 or into one of the so-called "master" openings 16.

Arranged below the inclined playing board 14 is a sliding panel 19 and arranged upon the sliding panel 19 below each of the ball exit openings 15 is a circuit closing device 20 in the form of a pair of spaced electrically conductive contacts which are moved into contacting engagement with each other by the weight of a ball arranged in the corresponding ball exit opening 15. Likewise arranged upon the sliding panel 19 below each of the "master" exit openings 16 is a circuit closing device 21 in the form of a pair of spaced contacts which are moved into engagement with each other by the weight of a ball arranged in the corresponding ball exit opening 16.

Figure 10:
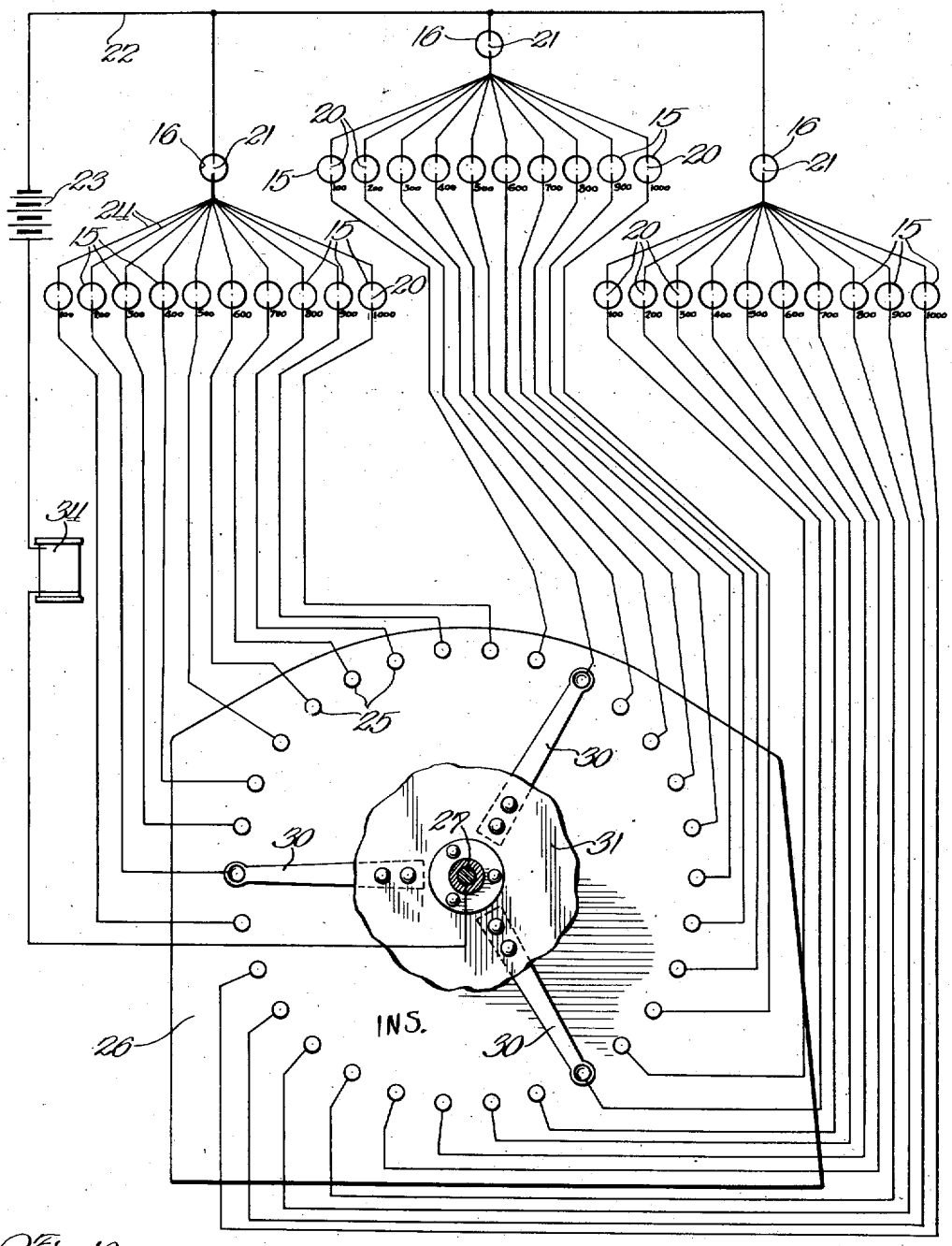
Fig. 10 is a wiring diagram of an electromagnetic circuit embodied in the invention.

These circuit closing devices 20 and 21 are arranged in an electrical circuit 22 in the manner diagrammatically illustrated in Fig. 10, there being one circuit closing device 21 and one "master" hole or exit opening 16 associated with each group of circuit closing devices 20, and corresponding group of ball exit openings 15.

The circuit 22 includes a battery 23 and an electromagnet 34 and comprises the wiring of the three groups of holes 16, 15 in parallel, as shown in Fig. 10. It will be apparent that the circuit 22 may be completed and the electromagnet 34 may be energized by completing the circuit through any one of the three groups.

In the embodiment of the invention illustrated, I have provided three master holes 16 shown near the top of the board 14 in Fig. 1. Each hole 16 is associated with a different color and cooperates with a group of holes 15 of the same color. Thus, the center hole 16 (Fig. 1) is the master hole of the "brown" group and is wired in the manner shown in Fig. 10 to the ten similarly colored openings 15 shown near the bottom of the board 14 in Fig. 1. As shown in Fig. 1, the holes 15 of each group are accorded different scoring values, for example, 100, 200, 300, 400, 500, 600, 700, 800, 900 and 1,000. These numbers are repeated in three consecutive series on the periphery of a dial 31. It may be here noted that the three series of these numbers are numerically arranged around the dial 31 in this particular embodiment of the invention.

Each of the other master holes 16 is associated with a similar group of similarly numbered openings 15. Thus, the left-hand opening 16 (Fig. 1) is the master hole of the "blue" group and is associated with the ten similarly colored openings 15 arranged in V-formation at the lower ends of the ornamental lines shown in the center of the board 14. The master hole 16 on the right, as viewed in Fig. 1, is the master hole of the "red" group and is associated with the two sub-groups of holes 15 of the same color, five located on either side of the "blue" group last referred to.

It is to be understood that each group of holes 15 has associated with its holes the same numbers 100, 200, 300, 400, 500, 600, 700, 800, 900 and 1,000 as are carried by the dial 31. It may here be noted that these scoring numbers are given for the purpose of distinguishing each hole individually and that other indicia may be employed for this purpose.

Figure 7:
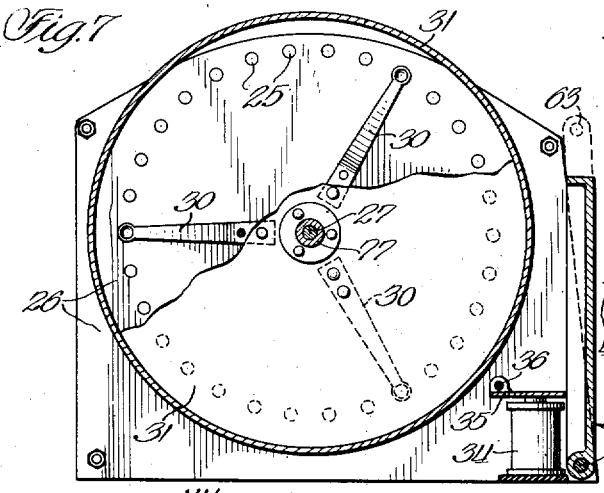
Fig. 7 is a view on line 7—7 in Fig. 4, partly in section and partly in side elevation.
Figure 11:
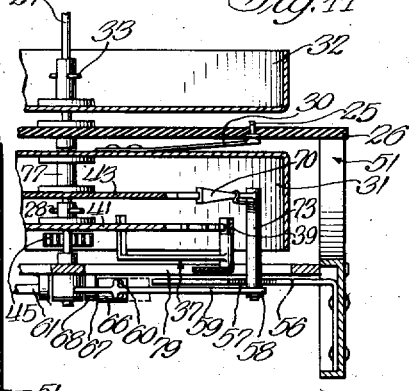
Fig. 11 is a sectional detail view on line 11—11 in Fig. 5.
Figure 9:
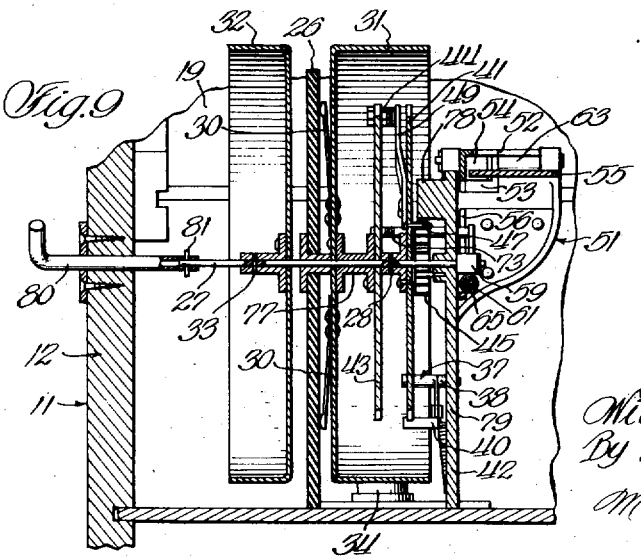
Fig. 9 is a vertical sectional view on line 9—9 in Fig. 4.

Each switch 20 is arranged in series with a conductor 24, one end of each conductor 24 being electrically connected to one side of the appropriate switch 21. The other end of each conductor 24 is electrically connected to a stationary contact post 25. The contact posts 25 have a circular arrangement upon a stationary panel 26 (Figs. 7, 9 and 11). This panel 26 is located in the cabinet 12 below the inclined playing board 14 and extending through the panel 26 is a horizontal shaft 27 which is suitably journaled in the cabinet 12 and extends transversely thereof below the inclined playing board 14.

In the embodiment of the invention illustrated, there are thirty contact posts 25 arranged equidistantly in a circle. There are three consecutive groups of ten posts each connected to one of the switches 20 of the holes 15. The connections between the switches 20 and posts 25 are such that the posts 25 are located in three consecutive groups corresponding to the "red", "blue" and "brown" groups of holes 15 and that the posts are arranged with their numerical values corresponding to the values of the openings 15 to which they are connected. The numerical values of the posts and the indicia on the dial 31 are arranged in the same order and direction.

The dial 31 (Fig. 9) is mounted for free rotation upon the shaft 27. This dial has a peripheral flange which carries the three series of numbers referred to. This dial is so located that one of said numbers is visible at any time to the player through the window 71 in the board 14. On one side the dial carries three resilient contact arms 30, these arms having a wiping contact or engagement with the relatively stationary contacts 25 which are arranged upon the panel 26. It is to be noted, in this connection, that the arms 30 are equally spaced and that one wiping contact arm 30 engages one of each group of stationary contacts 25. The location of the arms 30 is such that when a certain number, for example "200" of the dial 31 is visible through the window 71, then the three arms 30 are in engagement with the three contact posts 25 which are in turn connected to the switches 20 of the holes 15 of the "red", "brown" and "blue" groups which bear the value "200". It will thus be seen that if the switch 20 of one of these three holes and the switch 21 of the associated master hole 16 is closed, the circuit 22 will be completed and the electromagnet 34 will be energized, with results which will hereinafter be described.

Also arranged upon the shaft 27 and spaced axially therealong from the dial 31, is a second dial 32, upon which is arranged an annular row of numbers (Fig. 4), these numbers suitably being 0, 1, 2, 3, etc., up to a suitable point, for example, to the number 25. The dial 32 is fixed or keyed to the shaft 27, as indicated at 33 (Fig. 9) so that it rotates with the shaft.

A pivoted element 35 is located with the electromagnet 34, the pivotal element 35 being pivotally mounted between its ends, as at 36, in the cabinet 12. Engageable with the pivotal member 35 is a pawl 37, the latter being pivotally mounted between its ends, as at 38, in the cabinet 12 and having oppositely extending arms 39 and 40 which are engageable with the teeth of a ratchet 41 which is fixed upon the shaft 27. The arm 40 of the pawl 37 is biased out of engagement with the ratchet 41 by a spring 42.

Figure 8:
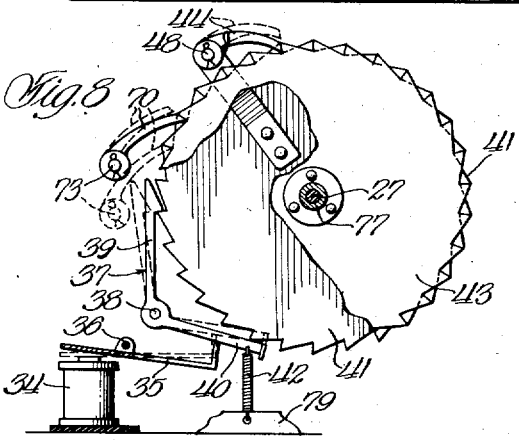
Fig. 8 is a view on line 8—8 in Fig. 4, partly in section and partly in side elevation.
Figure 12:
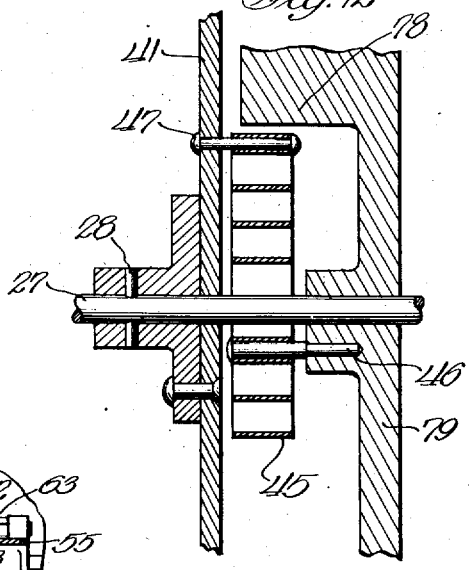
Fig. 12 is a fragmentary sectional detail on an enlarged scale.

Likewise arranged upon the shaft 27, adjacent the ratchet 41, is a second ratchet 43. This ratchet 43 is rigidly secured to the dial 31 by means of its hub 77, through which the shaft 27 extends (Fig. 9). The ratchet 41 carries an arm 49 on which is pivotally mounted, as at 48, a pawl 44, the pawl 44 being engageable with the teeth of the ratchet 43 (Figs. 8 and 9). It will be noted that the teeth of the ratchets 41 and 43 are directed in opposite directions and that in this embodiment of the invention they correspond to the number of indicia on the dial 31 and the number of posts 25 on the panel 26, which, in this particular case, is thirty.

Wound about the shaft 27, adjacent one end thereof, is a spiral spring 45 which has its outer end anchored on a pin 47 carried by the ratchet 41, and has its inner end anchored upon a pin 46 which is mounted on the frame member 79. As shown in Fig. 6, the spring is normally tensioned so that it tends to rotate the ratchet 41 in the counter-clockwise direction as viewed in Figs. 5 and 6. That is, the spring 45 tends to move the free game dial 32 to increase the reading thereof. That is, when the player attains an objective and energizes the magnet 34, the spring 45 rotates the dial 32 one step and the ratchet 41, through the action of the pawl 44, carries the ratchet 43 and the dial 31 one step also so as to change the objective for the next play.

Pivotally mounted at its lower end adjacent the electromagnet 34, as at 50, is a member 51. Pivotally mounted upon this member 51, at its upper end, as at 63, is a laterally or horizontally projecting arm 52 from which depend two spaced projections or lugs 53 and 54, one or both of these projections or lugs 53 or 54 being arranged in the path of the coin slide 55, which is slidably mounted in the lower end wall 56 of the cabinet 12. The two positions of the projections 53 and 54 are shown in Figs. 5 and 6.

The member 52 has a latch portion 69 which engages with the ratchet 41 at the beginning of a free game. This latch portion 69 is adapted to be engaged by a bracket 64 which projects from the ratchet wheel 41 (Fig. 6) at the beginning of play when a coin is inserted in the coin slide. The ratchet 41, shaft 27 and the free game dial 32 are arrested at the end of playing and when no free games remain to the credit of the player, and are normally held in their initial positions, that is, in the zero position of the dial 32, by the engagement of the bracket 64 on the ratchet 41 with a fixed stop 78 carried by the supporting frame 79. This position of arrestment is shown in Fig. 6 and it is to be noted that the arm 52 has been elevated by the engagement of the bracket 64 of the ratchet 41 with the end of the arm 52, so that the lug 54 is elevated out of the path of the coin slide 55. To initiate playing it is necessary to insert a coin in the coin slide 55 and to move it inwardly through its full stroke in order that it may engage the lug 53 and effect the necessary movement of the member 51 to move the panel 19 rearwardly and release the play balls to the player.

Figure 5:
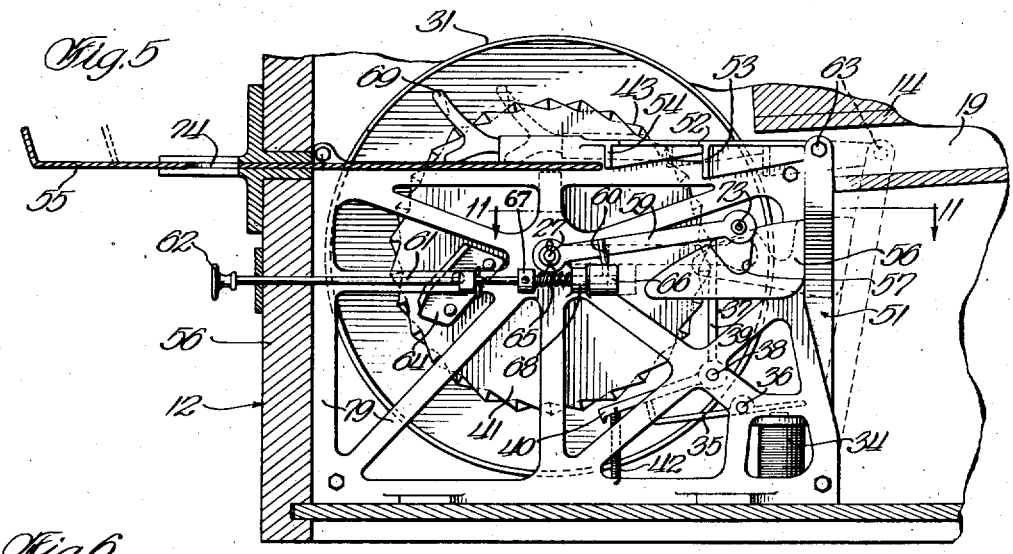
Fig. 5 is a vertical sectional view on line 5—5 in Fig. 4 with certain parts omitted to avoid crowding this figure.
Figure 6:
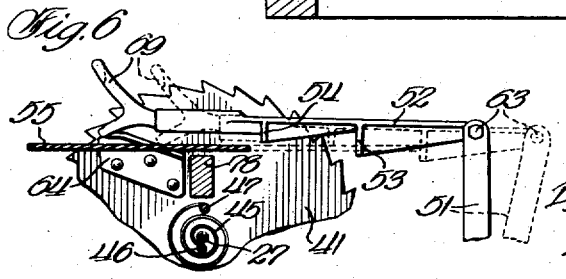
Fig. 6 is a detail view of part of the mechanism shown in Fig. 5.

When the ratchet 41 is in any position other than that of final arrestment, a condition which corresponds to one or more free games being available to the player, then the member 52 is in the position shown in Fig. 5. It will be seen that the coin slide 55 may engage the lug 54 and move the panel 19 for the playing of a new game with a throw which is possible without requiring the insertion of a coin in the slide 55.

Carried by the pivotal member 51, below the arm 52, is a forwardly projecting member or cam 56, in which is formed a notch 57 (Fig. 5). An arm 59 has an end portion 58 which is normally disposed above the notch 57 and this arm 59 is freely mounted on the shaft 27. The arm 59 has a lateral extension 60 which normally rests upon the upper surface of an enlarged portion 66 of a slide rod or plunger 61 which is suitably guided in the cabinet 12 for horizontal movement. This plunger 61 has a handle portion 62 which projects to the exterior of the cabinet 12. The plunger 61 is normally moved outwardly by a spring 65 which abuts against a guide element 68 on the frame member 79 and against a collar 68 carried by the plunger 61. The arm 59 has a lateral extension 73 (Fig. 4) upon which is pivotally mounted a pawl 70, the pawl 70 being disposed in engagement with the ratchet 43 (Figs. 4 and 8). The extension 73 is disposed above the notch 57 in the cam 56 so that it may be swung into the latter in a manner hereinafter described. The two sight openings 71 and 72 (Fig. 1) provided in the playing board 14 near the player's position, enable the readings of the two dials 31 and 32 respectively to be viewed by the player to determine in the first case the objective for which the machine is set and, in the second case, the number of free games which stand to the player's credit.

From the lower end of the sliding panel 19 the played balls are guided into a transverse runway 75 (Fig. 2) from which they are guided back to a point adjacent the elevating device 76 (Fig. 1) which may be of any suitable type, being adapted to elevate the balls to be played seriatim onto the ramp 71.

*Operation*

The following example is intended to illustrate a typical game played upon the new apparatus and is not intended to serve as a limitation upon the procedure the player may follow in playing the game, since there may be considerable variation in the manner in which the game may be played. However, the following example will serve to illustrate the manner in which the various elements of the game cooperate in normal use.

In its normal condition one of the group of numbers on the dial 31 will be visible through the sight opening 71. Thus, for example, the numeral "200" on the dial 31 may be visible through this sight opening. The dial 32 indicates that the player has no free games to his credit, the numeral "0" being visible through the opening 72. Assuming the player desires to accept the number "200" as his objective, he then inserts a suitable coin in the coin slide 55 and projects it inwardly to its full extent. For the reasons indicated above, the lever 52 is in its elevated position, as shown in full lines in Fig. 6, and the coin slide 55 engages the rear projection 53. Owing to its elevated position, the detent 69 of the member 52 does not come into contact with the ratchet 41 during this operation of the coin slide.

The rearward movement of the member 51 from the position shown in full lines in Fig. 6 into the position shown in dotted lines in that figure moves the board 19 rearwardly and permits the balls on the board 14 to roll into the chute 75 where they are available to the player. The player now attempts to play a ball by means of the plunger 18 onto the inclined playing board 14 so that it will gravitate thereover and enter into one of the three scoring openings 15 which bears the numerical scoring value "200" (Fig. 1). If he is successful he then endeavors to play another ball into the particular master opening 16 which is associated with that particular opening 15, as is shown by similarity of color. That is, if the player succeeds in playing one ball into the "red" opening marked "200", then to win the game he must succeed in directing another ball into the "red" master opening 16. Of course, the balls can be located in the reverse order and the circuit 22 becomes closed in either case. The closing of the circuit when the switches 20 and 21 of the same group are closed, will readily be understood from Fig. 10, the closed circuit being around 20, 21, 23, 34, 30, and 25. It may here be remarked that owing to the dial 31 being at the "200" position, the three arms 30 are in contact with the three "200" posts 25, which in turn are connected to the three switches 20 of the three "200" holes 15 of the "red", "brown" and "blue" groups. Consequently, the electromagnet 34 is energized when a ball is placed in one of the holes 15 bearing the value "200" and a ball is located in the master hole 16 of the same color group.

When the electromagnet 34 is energized by the completion of the circuit 22, it attracts the member 35 and swings the latter about its pivot 36 in the counter-clockwise direction, as viewed in Fig. 8. This movement of the member 35 swings the pawl 37 and its arms 39 and 40 in a counter-clockwise direction, from the full to dotted line position shown in Fig. 8. This permits the spring 45 to rotate the shaft 27, ratchet 41 and dial 32 in the clockwise direction, as viewed in Fig. 8, the movement being arrested by the detent at the end of the arm 40. This movement of the ratchet 41 acts through the arm 49, 48 and the pawl 44 to move the ratchet 43 and its attached hub 77, and dial 31 and its attached contact arms 30, a corresponding circumferential distance in the clockwise direction, as viewed in Fig. 8. Owing to this movement, the contact arms 30 are moved into inoperative positions between adjacent contacts 25 and the circuit 22 is opened. The electromagnet 34 then becomes de-energized whereupon the spring 42 swings the escapement pawl 37 in the clockwise direction, as viewed in Fig. 8, thus moving the detent at the end of the arm 40 out of engagement with the ratchet 41 and at the same time moving the detent at the end of arm 39 into the path of the ratchet 41. The operating spring 45 then completes the rotation of the shaft 27, ratchet 41 and associated parts, including the contact arms 30, in the clockwise direction as viewed in Fig. 8, and in this manner the contact arms 30 are moved into engagement with the three stationary contacts 25 which are associated with the holes 15 bearing the indicia "300", this being the number of the dial 31 which is now visible through the window 71 and constitutes the objective for the new game.

As has been indicated, the dial 32 moves with the dial 31 through one step and consequently the "0" numeral is no longer visible in the sight opening 72, but has been replaced by the succeeding numeral "1", indicating that one free game is available to the player.

It may here be noted that if the player has, before the completion of the circuit 22 as just described, located a ball in another opening 15 bearing the indicia "300" and also a ball in the corresponding master hole 16, then the circuit 22 will again be completed and the electromagnet 34 will be energized, the dial 32 will be moved to indicate two free games available to the player and the objective will be automatically changed to "400". If the player has previously succeeded in completing these objectives; that is, a ball in the opening 15 of the same group bearing the indicia "300", as stated, the first free movement described above will also cause the closing of the circuits for the "300" opening to register another free game, and the objective is now changed to the "400" opening. If, on the other hand, a ball has previously been lodged in the "300" opening of another group of "15" holes, the lodging of the ball in the "16" or master hole of this other group will effect registry of another free game.

Play may be continued as long as there are balls available in each game operation. After the supply of balls for one game becomes exhausted, a complete set of balls may be supplied for re-playing the game by proper actuation of the mechanism if one or more free games are due the player, or otherwise by the deposit of an additional coin.

If we assume at this time that the reference numeral "8" on the dial 32 is visible through the sight opening 72, indicating that the player has succeeded in making his point or objective eight consecutive times, he is entitled to play eight free games without inserting a coin into the coin aperture 74 of the slide 55. To play the first of such games he merely pushes the slide 55 inwardly without inserting a coin and, owing to its engagement with the lug 54 of the arm 52, the panel 19 is moved back so as to release the play balls and render them available for playing. When this occurs the detent 69 on the arm 52 engages the ratchet 41 and rotates it through one step, rotating the dial 32 so that it now presents the number "7" through the opening 72. This rotation of the shaft 27 has no effect upon the ratchet 43, which is held against rotation by the pawl 70.

Assuming that at the start of the game the numeral "200" on the dial 31 is visible through the opening 71, but the player does not desire to accept this number as his objective, he may change that objective to the next highest objective, or if that number were "1000" he may change it to "100" during the actuation of the coin slide 55. To attain this result the player pushes the rod 61, 62 inwardly against the action of the spring 65, whereupon the latter extension 60 of the latch member 59 falls off the end portion 66 of the plunger 61 and between the latter and the guide 68. The lateral extension 73 of the member 59 then drops down into the notch 57 which is formed in the cam portion 56 of the member 51. This movement, of the member 59 and its lateral extension 73, allows the pawl 70 to drop from the full to the dotted line position shown in Fig. 8. Consequently, when the player inserts a coin of proper denomination in the coin aperture 74 of the coin slide 55 and pushes the latter inwardly, that is, from left to right as viewed in Fig. 6, the inner end of the coin slide 55 engages the lug 53 of the member 52 and swings the members 52 and 51 in clockwise direction as viewed in Figs. 5 and 6, to effect the appropriate movement of the panel 19. This movement of the member 51 and its extension 56 swings the member 59 and its lateral extension 73 in the counter-clockwise direction, as viewed in Fig. 5, with the result that the pawl 70 is elevated and, owing to its engagement with the ratchet 43, this ratchet is rotated in the counter-clockwise direction as viewed in Fig. 5, or in the clockwise direction as viewed in Fig. 8. Fig. 8 shows in dotted and full lines the lower and upper positions of the pawl 70 which have just been referred to. Consequently, the ratchet 43 and its attached dial 31 are advanced one step in a counter-clockwise direction, as viewed in Fig. 5.

If the player has one or more free games to his credit and desires to change his objective score in this manner, before commencing play, he can proceed in the same way without, however, inserting a coin in the slide 55. He is, therefore, unable to and does not need to move the coin slide through its full throw, but he does need to press the plunger 62 inwardly so as to obtain the desired movement of the pawl 70. During these manipulations the dial 32, shaft 27 and ratchet 41 remain stationary, the pawl 44 slipping over the moving periphery of the ratchet 43, its swinging motion being indicated in full and dotted lines in Fig. 8.

The player continues to play in this fashion without inserting a coin in the coin slide until at last his free games are used up and the dial 32 shows the zero mark through the opening 72. When this dial shows one free game and the coin slide is actuated, it releases the play balls as above described and it also moves the ratchet 41 to bring the bracket 64 into a position where it may engage the free end of the member 52 when the latter moves forwardly again, under the influence of the panel 19 or the springs which are normally secured thereto. The bracket 64 is configured so that it serves as a cam to elevate the member 52, thus bringing the depending lug of the member 52 out of the path of the coin slide 55. The same elevation moves the latch 69 of the member 52 out of engagement with the ratchet 41. Thus, the machine is put into a condition in which it cannot be played until the coin slide is pushed inwardly to its fullest extent with the aid of an inserted coin. When an objective is attained, the bracket 64 is moved away from the member 52 and this member is now in a position for operation to play a free game.

The proprietor of the game may reset the free game dial 32 back to zero position without operating the coin slide 55, by merely attaching a suitable crank or handle 80 to the shaft 27 with the aid of a pin 81 (Fig. 9) and rotating the crank in the appropriate direction.

While I have illustrated and described a preferred embodiment of my invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a game apparatus, the combination of: a cabinet having two sight openings formed therein and having an inclined playing board therein; said inclined playing board having a group or bank of ball exit scoring openings formed therein and having formed therein a master ball exit scoring opening; means for propelling balls one at a time onto the upper portion of said playing board so that they may gravitate thereover and enter into one of said group of scoring openings or into said master exit opening; a rotatable dial in said cabinet having numerals thereon visible through one of said sight openings and said numerals corresponding to the numerical scoring value of said scoring openings; a rotatable dial having an annular row of numerals thereon successively visible through the other of said sight openings and each representing a predetermined number of free games to be allowed the player if he succeeds in playing a ball into that particular one of said scoring openings which has a scoring value corresponding to the numerical indicium on the first-named one of said dials which is visible through the said first-mentioned one of said sight openings at the start of the game; and means actuated jointly by a ball entering the said one of said scoring openings and by a ball entering the said master opening to advance the second-named one of said dials a predetermined circumferential distance so as to expose to view through the second-named one of said sight openings the numerical indicium on the second-named one of said dials which corresponds to a predetermined number of free games to be allowed the player, if he succeeds in playing the said balls in the manner stated.

2. In a game apparatus, the combination of: a cabinet having two sight openings formed therein and having an inclined playing board therein; said inclined playing board having a group or bank of ball exit scoring openings formed therein and having formed therein a master ball exit scoring opening; means for propelling balls one at a time onto the upper portion of said playing board so that they may gravitate thereover and enter into one of said group of scoring openings or into said master scoring opening; a rotatable dial in said cabinet having numerical indicia thereon visible through one of said sight openings and said indicia corresponding to the numerical scoring value of said scoring openings; a member slidably mounted in a wall of said cabinet; a rotatable dial having an annular row of numerical indicia thereon successively visible through the other of said sight openings and each representing a predetermined number of free games to be allowed the player if he succeeds in playing a ball into that particular one of said scoring openings which has a scoring value corresponding to the numerical indicium on the first-named one of said dials which is visible through the first-mentioned one of said sight openings at the start of the game; means actuated jointly by a ball entering the said one of said scoring openings and by a ball entering the said master opening to advance the second-named one of said dials a predetermined circumferential distance so as to expose to view through the second-named one of said sight openings a numerical indicium on the second-named one of said dials which corresponds to a predetermined number of free games to be allowed the player if he succeeds in playing the said balls in the manner stated; means for temporarily retaining therein balls which enter into said scoring openings; and means coacting with said slidable member and necessitating only a partial inward movement or operative stroke of the latter, when the indicium on the said second-named or free game dial which is visible through the corresponding one of said sight openings is greater than "zero", to move said ball-retaining means into ball-releasing position and, simultaneously therewith, to return said second-named dial a predetermined circumferential distance in a direction opposite to the direction of its movement by said ball-actuated means so as to expose to view through the second-named one of said sight openings the next successive and numerically smaller number on the said second-named dial which indicates the number of free games to be allowed the player.

3. In a game apparatus, the combination of: a cabinet having a sight opening formed therein and having an inclined playing board therein; said inclined playing board having a group or bank of ball exit or scoring openings formed therein; a member slidably mounted in a wall of said cabinet; means for propelling balls one at a time onto the upper portion of said playing board so that they may gravitate thereover and enter into said scoring openings; a dial in said cabinet having an annular row of numerals thereon visible through said sight opening and each indicating a predetermined number of free games to be allowed the player; means including an electromagnetic device actuated by balls entering certain combinations of said ball exit or scoring openings to move said free game dial a predetermined circumferential distance in one direction; and means coacting with said member to return said dial a predetermined circumferential distance in a direction opposite to the said first-named direction each time the said member is operated.

4. In a game apparatus, the combination of: a cabinet having two sight openings formed therein and having an inclined playing board therein; said inclined playing board having a group or bank of ball exit or scoring openings formed therein and having a master ball exit opening formed therein; means for propelling balls one at a time onto the upper portion of said playing board so that they may gravitate thereover and enter into said ball exit or scoring openings or into said master exit opening; a rotatable dial in said cabinet having an annular row of numerals thereon visible through one of said sight openings and said numerals corresponding to the numerical scoring value of said scoring openings; a member slidably mounted in a wall of said cabinet; a rotatable dial having an annular row of numerals thereon successively visible through the other of said sight openings and each representing a predetermined number of free games to be allowed the player if he succeeds in playing a ball into that particular one of the said scoring openings which has a scoring value corresponding to the numeral on the first-named one of said dials which is visible through the said first-mentioned one of said sight openings at the start of the game; and means including an electromagnetic device actuated jointly by a ball entering the said one of said scoring openings and by a ball entering the said master opening to advance the second-named one of said dials a predetermined circumferential distance so as to expose to view through the second-named one of said sight openings the numeral on the second-named one of said dials which corresponds to the number of free games to be allowed the player if he succeeds in playing the said balls in the manner stated.

5. In a game apparatus, the combination of: a cabinet including a member providing a playing surface and said member being provided with ball exit openings; means for propelling balls one at a time onto the upper portion of said playing board so that they may gravitate thereover and enter into said exit openings; a slidable member arranged in said cabinet below said playing surface and temporarily retaining thereon balls which enter into said exit openings; a second slidable member mounted in a wall of said cabinet; means coacting with said second-named slidable member to move said first-named slidable member into position to release balls held thereby for return to a point adjacent said propelling means; said second-named means being normally disposed in a position to require a full inward movement or operative stroke of the said second-named slidable member to effect movement of said first-named slidable member into ball-releasing position; and means including devices actuated by balls entering certain combinations of said exit openings for moving said second-named means into a position in which the said second-named means in able to coact with said second-named slidable member to move said first-named slidable member into ball-releasing position without requiring a full inward movement or operative stroke of said second-named slidable member.

6. In a game apparatus, the combination of: a cabinet including a member providing a playing surface and said member being provided with ball exit openings; means for propelling balls one at a time onto the upper portion of said playing board so that they may gravitate thereover and enter into said exit openings; a slidable member arranged in said cabinet below said playing surface and temporarily retaining thereon balls which enter into said exit openings; a second slidable member mounted in a wall of said cabinet; means coacting with said second-named slidable member to move said first-named slidable member into position to release balls held thereby for return to a point adjacent said propelling means; said second-named means being normally disposed in a position to require a full inward movement or operative stroke of the said second-named slidable member to effect movement of said first-named slidable member into ball-releasing position; and means including an electromagnetic device actuated by balls entering certain combinations of said exit openings for moving said second-named means into a position in which the said second-named means is able to coact with said second-named slidable member to move said first-named slidable member into ball-releasing position without requiring a full inward movement or operative stroke of said second-named slidable member.

7. In a game apparatus, the combination of: a cabinet having therein a member providing a playing surface and said member having ball exit or scoring openings formed therein; means for propelling balls one at a time onto said playing surface so that they may enter into said ball exit or scoring openings; a member slidably mounted in a wall of said cabinet; means for temporarily retaining therein balls which enter into said ball exit or scoring openings; means coacting with said slidable member and normally requiring a complete or full operative stroke of the latter to move said ball-retaining means into position to release balls held thereby for return to a point adjacent said propelling means; said cabinet having a sight opening formed therein; a dial arranged in said cabinet and having indicia thereon visible through said sight opening and corresponding to the scoring values of certain of said ball exit or scoring openings; and the particular indicium on said dial which is visible at the start of play indicating that particular one of said scoring openings which is the player's objective; a second and registering dial in said cabinet having numerical indicia thereon indicating a predetermined number of free games to be allowed the player, without necessitating a complete or full operative stroke of the said slidable member, to move said ball-retaining means into ball-releasing position, if balls are played into certain combinations of said scoring openings; and means including devices actuated by balls entering into certain combinations of said scoring openings for advancing the said free game registering dial a predetermined circumferential distance so as to indicate thereon a predetermined number of free games credited to the player.

8. In a game apparatus, the combination of: a cabinet having therein a member providing a playing surface and said member having ball exit or scoring openings formed therein; means for propelling balls one at a time onto said playing surface so that they may enter into said ball exit or scoring openings; a member slidably mounted in a wall of said cabinet; means for temporarily retaining therein balls which enter into said ball exit or scoring openings; means coacting with said slidable member and normally requiring a complete or full operative stroke of the latter to move said ball-retaining means into position to release balls held thereby for return to a point adjacent said propelling means; said cabinet having a sight opening formed therein; a dial arranged in said cabinet and having indicia thereon visible through said sight opening and corresponding to the scoring values of certain of said ball exit or scoring openings; and the particular indicium on said dial which is visible at the start of play indicating that particular one of said scoring openings which is the player's objective; a second and registering dial in said cabinet having numerical indicia thereon indicating a predetermined number of free games to be allowed the player, without necessitating a complete or full operative stroke of the said slidable member, to move said ball-retaining means into ball-releasing position, if balls are played into certain combinations of said scoring openings; and means including an electromagnetic device actuated by balls entering into certain combinations of said scoring opening for advancing the said free game registering dial a predetermined circumferential distance so as to indicate thereon a predetermined number of free games credited to the player.

9. In a game apparatus, the combination of: a cabinet having therein a member providing a playing surface and said member having ball exit or scoring openings formed therein; means for propelling balls one at a time onto said playing surface so that they may enter into said ball exit or scoring openings; a member slidably mounted in a wall of said cabinet; means for temporarily retaining therein balls which enter into said ball exit or scoring openings; means coacting with said slidable member and normally requiring a complete or full operative stroke of the said slidable member to move said ball-retaining means into position to release balls held thereby for return to a point adjacent said propelling means; said cabinet having a sight opening formed therein; a dial arranged in said cabinet and having indicia thereon visible through said sight opening and corresponding to the scoring values of certain of said ball exit or scoring openings, and the particular indicium on said dial which is visible at the start of play indicating that particular one of said scoring openings which is the player's objective; a second and registering dial in said cabinet having numerical indicia thereon indicating a predetermined number of free games to be allowed the player, without necessitating a complete or full operative stroke of the said slidable member, to move said ball-retaining means into ball-releasing position, if balls are played into certain combinations of said scoring openings; means including devices actuated by balls entering into certain combinations of said scoring openings for advancing the said free game registering dial a predetermined circumferential distance so as to indicate thereon a predetermined number of free games credited to the player; and means for advancing the first-named dial a predetermined circumferential distance at the will of the player so that the player may, at the beginning of the game, choose his objective score as indicated by the indicium on said first-named dial which is visible through said sight opening at the start of play.

10. In a game apparatus, the combination of: a cabinet having therein a member providing a playing surface and said member having ball exit or scoring openings formed therein; means for propelling balls one at a time onto said playing surface so that they may enter into said ball exit or scoring openings; a member slidably mounted in a wall of said cabinet; means for temporarily retaining therein balls which enter into said ball exit or scoring openings; means coacting with said slidable member and normally requiring a complete or full operative stroke of the latter to move said ball-retaining means into position to release balls held thereby for return to a point adjacent said propelling means; said cabinet having a sight opening formed therein; a dial arranged in said cabinet and having indicia thereon visible through said sight opening and corresponding to the scoring values of certain of said ball exit or scoring openings, and the particular indicium on said dial which is visible at the start of play indicating that particular one of said scoring openings which is the player's objective; a second and registering dial in said cabinet having numerical indicia thereon indicating a predetermined number of free games to be allowed the player without necessitating a complete or full operative stroke of the said slidable member, to move said ball-retaining means into ball-releasing position, if balls are played into certain combinations of said scoring openings; means including an electromagnetic device actuated by balls entering into certain combinations of said scoring openings for advancing the said free game registering dial a predetermined circumferential distance so as to indicate thereon a predetermined number of free games credited to the player; and means for advancing the first-named dial a predetermined circumferential distance at the will of the player so that the player may, at the beginning of the game, choose his objective score as indicated by the indicium on said first-named dial which is visible through said sight opening at the start of play.

11. In a game apparatus, the combination of:

a cabinet having therein a member providing a playing surface and said member having ball exit or scoring openings formed therein; means for propelling balls one at a time onto said playing surface so that they may enter into said ball exit or scoring openings; a member slidably mounted in a wall of said cabinet; means for temporarily retaining therein balls which enter into said exit or scoring openings; means coacting with said slidable member and normally requiring a complete or full operative stroke of the said slidable member to move said ball-retaining means into position to release balls held thereby for return to a point adjacent said propelling means; said cabinet being provided with a sight opening; a dial arranged in said cabinet and having indicia thereon successively visible through said sight opening and corresponding to the scoring values of certain of said ball exit or scoring openings; and the particular indicium on said dial visible at the start of play indicating that particular one of said scoring openings which is the player's objective; a second dial in said cabinet having numerical indicia thereon each indicating a predetermined number of free games to be allowed the player, without necessitating a complete or full operative stroke of the said slidable member, to move said ball-retaining means into ball-releasing position, if balls are played into certain combinations of said scoring openings; means including devices actuated by balls entering into certain combinations of said scoring openings for advancing the said second-named dial a predetermined circumferential distance so as to indicate thereon a predetermined number of free games to be allowed the player; and the said third-named means which coacts with said slidable member to move said ball-retaining means including an element requiring a full or complete operative stroke of said slidable member to move the latter into engagement with said element so as to move said ball-retaining means into ball-releasing position when said second-named dial is in its initial or "zero" position.

12. In a game apparatus, the combination of: a cabinet including a member providing a playing surface and said member having ball exit or scoring openings formed therein; means for propelling balls over said playing surface so that they may enter into said ball exit or scoring openings; means arranged below said playing surface for temporarily stopping balls which enter said exit openings; a member slidably mounted in a wall of said cabinet; means coacting with said slidable member and normally requiring a full or complete inward movement or operative stroke of said slidable member to move said stopping means into position to release balls held thereby for return to a point adjacent said propelling means; said third-named means including a device actuated by balls entering certain combinations of said exit openings and when thus actuated being moved into a position to coact with said slidable member to move said ball-stopping means into position to release balls held thereby for return to a point adjacent said propelling means, without requiring a complete inward movement or operative stroke of said slidable member.

13. In apparatus of the class described, means for playing a game to attain a game objective, adjustable means for indicating the game objective, coin controlled means for setting the first said means for play, free game means for resetting the first said means for the playing of a free game, said free game means normally being ineffective to reset the first said means, means operable by the first said means whenever the same is operated to attain the game objective for rendering said free game means effective to reset the first said means for playing a free game, and means automatically operable by the first said means when the same is operated to attain the game objective for changing the game objective.

14. In apparatus of the class described, means for playing a game to attain a game objective, means for changing the game objective, means for indicating the game objective, coin controlled means for setting the first said means for play, free game means for resetting the first said means for the playing of a free game, said free game means normally being ineffective to reset the first said means, means operable by the first said means whenever the same is operated to attain the game objective indicated on the indicating means for rendering said free game means effective to reset the first said means for playing a free game, and means automatically operable by the first said means when the same is operated to attain the game objective indicated by said indicating means for changing the game objective and for adjusting said indicating means to indicate the new objective.

15. In apparatus of the class described, means for playing a game to attain a game objective, adjustable means for indicating the game objective, coin controlled means for setting the first said means for play, free game means for resetting the first said means for the playing of a free game, said free game means normally being ineffective to reset the first said means, means operable by the first said means whenever the same is operated to attain the game objective for rendering said free game means effective to reset the first said means for playing a free game, means automatically operable by the first said means when the same is operated to attain the game objective for changing the game objective, and manual means for optionally changing the game objective.

WILLIAM H. BELLAH.